United States Patent
Dabbish et al.

[11] Patent Number: 5,917,911
[45] Date of Patent: Jun. 29, 1999

[54] METHOD AND SYSTEM FOR HIERARCHICAL KEY ACCESS AND RECOVERY

[75] Inventors: Ezzat A. Dabbish, Cary; Robert Lawrence Geiger, Algonquin; Larry Charles Puhl, Sleepy Hollow, all of Ill.

[73] Assignee: Motorola, Inc., Schaumburg, Ill.

[21] Appl. No.: 08/788,068

[22] Filed: Jan. 23, 1997

[51] Int. Cl.[6] ................................. H04L 9/30
[52] U.S. Cl. ..................... 380/21; 380/30; 380/49
[58] Field of Search ................. 380/21, 30, 49

[56] References Cited

U.S. PATENT DOCUMENTS

| | | | |
|---|---|---|---|
| 4,888,801 | 12/1989 | Forster et al. | 380/21 |
| 4,944,007 | 7/1990 | Austin | 380/21 |
| 4,969,188 | 11/1990 | Schobi | 380/23 |
| 5,335,281 | 8/1994 | Tugenberg et al. | 380/48 |
| 5,341,426 | 8/1994 | Barney et al. | 380/21 |
| 5,341,427 | 8/1994 | Hardy et al. | 380/21 |
| 5,369,702 | 11/1994 | Shanton | 380/4 |
| 5,420,927 | 5/1995 | Micali | 380/23 |
| 5,564,106 | 10/1996 | Puhl et al. | 380/21 |
| 5,850,451 | 12/1998 | Sudia | 380/49 |

*Primary Examiner*—Gilberto Barron, Jr.
*Attorney, Agent, or Firm*—Gregory J. Gorrie

[57] ABSTRACT

A key management system includes a hierarchy (10) of independent key arbitration centers (KAC) for providing access to a user's session keys through key management centers (KMC). When a court order is issued for a user's session keys, a message requesting the keys is transferred down through hierarchy until a terminal KAC (16,36) is reached. Each KAC in the hierarchy adds its ID and signs (116) the message, verifying prior signatures (114). The user's ID is encrypted with the terminal KAC's public key. The terminal KAC engages in a blind key access procedure (129) with the KMC (18,38) to receive the user's session key. The key is provided encrypted with the requesting party's or agency's public key. Accordingly, privacy is assured because only the KMC and the requesting agency have access to the actual key value, and only the terminal KAC and requesting agency have access to the user's ID. No other KACs in the hierarchy have access to the user ID or key value, and the KMC does not know which user's key has been provided.

21 Claims, 3 Drawing Sheets

METHOD AND SYSTEM FOR HIERARCHICAL KEY ACCESS AND RECOVERY

FIELD OF THE INVENTION

This invention relates in general to the field of cryptography, in particular to key management and authentication, and more particularly to accessing and recovering encryption keys.

BACKGROUND OF THE INVENTION

Government agencies may need access to encryption keys of users or organizations for court-authorized law enforcement purposes. However, because of privacy and efficiency issues, it is desirable for private businesses or individuals to maintain their encryption keys for their employees and customers and to allow for emergency key recovery and also to allow access by the government agencies only when such access is authorized by the courts. Furthermore, such access should be authorized only for as long as such a court order is valid, and only the government agency should have access to the actual key value. It is also desirable that when an encryption key is requested, that the user or device does not know it is being monitored by the government agency.

Accordingly, what is needed is a method that provides access by the government to an encryption key pursuant only to a valid court order. What is also needed is a method of providing access to an encryption key such that when encryption keys are provided to a government agency pursuant to a court order, only the agency has access to the actual key value. Furthermore, what is also needed is a method of providing access to an encryption key such that only authorized parties know the identity of the device or user being monitored. What is also needed is a method of providing access to an encryption key only for as long as a court order for such a key is valid. What is also needed is a method of providing access to an encryption key that provides an audit trail so that it can be verified that proper procedures have been followed during all steps of the key access process.

More generally, there is a need for securely providing encryption keys to an authorized party pursuant to an authorized request without the user's knowledge.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a method for approved encryption key access by appropriate legal entities. The inventors take the position that citizens should be able to use the cryptography of their choice when and how they desire. The inventors also recognize that law enforcement may require, with the proper and legally obtained court order, the ability to decrypt the citizens traffic and communications for the purpose of a valid investigation. The invention described herein provides an approach for key access and recovery. The issue of key recovery and access is a controversial one involving the concerns of citizens, companies, governments and law enforcement agencies around the world. In order for any approach for key access to be acceptable to these diverse interests, it should address some of the basic concerns discussed below.

In a preferred embodiment, the present invention provides for access to an encryption key when, for example, a court order, approved by a court has been obtained. The present invention also provides, among other things, a method of providing access to an encryption key wherein manufacturers, operators or attackers are not able to decrypt a user's messages in any amount of time commensurate with the security level in use by the user. The present invention also provides, in another preferred embodiment, a method of key access wherein user's messages are not able to be decrypted after a court order expires.

The present invention also provides, among other things, a method of providing key access where only authorized parties, such as the government and court, know the identity of the individual or device which key is being accessed (e.g., the person or device which will be wiretapped or monitored). Furthermore, the present invention provides, in a preferred embodiment, a method of providing access to an encryption key wherein manufacturers, operators, and attackers, in general, will not be able to determine who is being monitored. In accordance with these preferred embodiments of the present invention, the key management system helps maintain the rights and independence of state, local and foreign governments in regard to key access and key recovery. In accordance with the one embodiment of the present invention, a manufacturer does not have to maintain a large key database for products sold and furthermore does not have the added cost due to the maintenance of a substantial key recovery system. In accordance with other preferred embodiments of the present invention, operators do not have to maintain large databases in order to implement the protocols and procedures for key access and recovery described herein.

The term session key as used herein, means a key used for the encryption of data or other information. A session key is generally not permanent and may be changed with some reasonable regularity. Access to a session key allows a third party such as law enforcement to decrypt communications for a given finite period of time (i.e., as long as the session key is valid). As used herein, any key used to decrypt groups of files, data or information is considered a session key even though it is very long lived and may have no expiration period.

The term key management centers (KMC) as used herein means an entity that generates, stores and/or manages a user's or organization's session keys. Key arbitration centers (KAC) as used herein, means an entity that handles the interactions for key recovery appropriate for its level in the hierarchy. This is discussed in more detail below. In general KACs are entities run by private or public concerns and which arbitrate the key access and key recovery processes.

Figure 1:
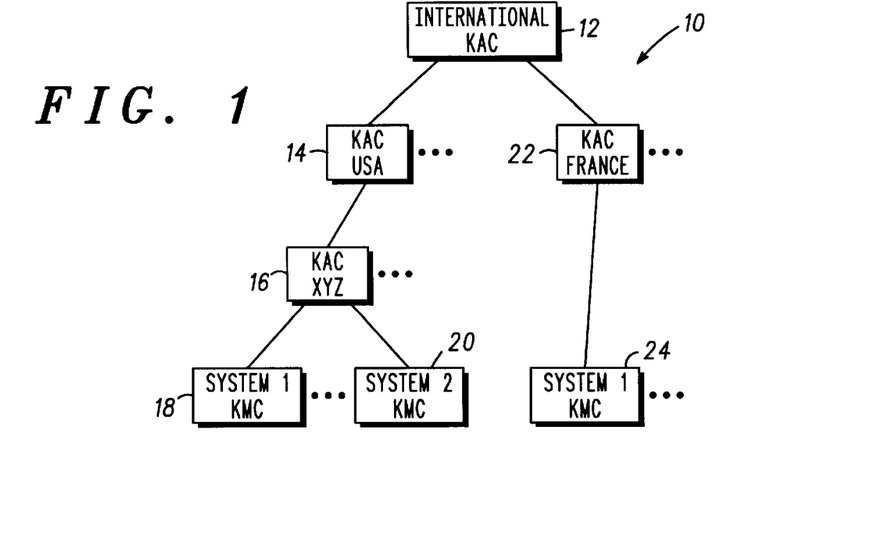
FIG. 1 illustrates a hierarchical key management system in accordance with a preferred embodiment of the present invention.

FIG. 1 illustrates a hierarchical key management system in accordance with the preferred embodiment of the present invention. The hierarchy 10 of KACs includes international KAC 12 coupled with a KAC from participating countries. For example, KAC 14 is for the United States and KAC 22 is for France. Each national KAC such as KAC 14 is coupled to a plurality of local or regional KACs such as KAC 16. Local or regional KACs 16 may or may not be associated with any particular geographic region and may be associated with certain groups of companies or certain organizations. In the preferred embodiment, there may be one KAC associated with each state in the United States, but this is not a requirement. Each KAC, local or regional 16 has several other lower level KACs below it arranged in a hierarchy. At the lowest level nodes in this hierarchy of KACs are key management centers (KMC). Each KMC is coupled with one KAC. Accordingly, for each KMC there is only one path up through the hierarchy to the highest level KAC. Any KAC coupled with a KMC is herein referred to as a terminal KAC for that particular KMC. For the example shown in FIG. 1, KAC 16 is the terminal KAC for KMC 18 and KMC 20. In the example shown in FIG. 1 KAC 16 may be a higher level KAC for lower KACs which are terminal KACs for other KMCs.

In the example shown in FIG. 1, France KAC 22 may have its own hierarchy arranged below it with several intermediate KACs. Alternatively, KAC 22 maybe coupled directly to a KMC. Each country preferably has its own hierarchy arranged similarly to that shown in FIG. 1. In the embodiment shown in FIG. 1, international KAC 12 holds no key and has no global authority other than to complete the tree hierarchy and to facilitate communication among the various country KACs.

In another embodiment, KAC 12 may be an international arbitrator set up by treaty. In another embodiment, not shown in FIG. 1, international KAC 12 may be part of a hierarchy of international KACs that operate similarly to the hierarchy of KACs in the United States example.

The hierarchical structure shown in FIG. 1 is designed with a free market approach in mind. Individuals, companies and system operators, which may be KMCS, can chose which key arbitration center with which to connect. The KMCs are intended to be as simple as possible. Each key management center, for example, may provide and store current session keys for the users system or device. The system operator may contract with the third party for this KMC service if so desired. The key management center may use any means to deliver these keys to the user or to the device.

In accordance with a preferred embodiment of the present invention, all session keys are properly obtained from one of the KMCs at the bottom nodes in the hierarchy of FIG. 1. In the preferred embodiments of the present invention, each KMC engages in a blind access protocol with at least one KAC as described below. Alternatively, a KMC may be located inside an individual communication device. When this is the situation, there is no need for a blind access protocol since only a single session key is usually stored at any time. The nodes of the hierarchy, the KACs of FIG. 1 are preferably assigned a security level by the relevant authorities and each level is allowed connectivity to the system at that level. Any properly registered KAC that operates at the improper level will be invalidated. In the embodiment described herein, public/private key technology is used for securing communications. Those with skill in the art will understand other methods of securing communications may also be used. As messages pass through each node of the tree an ID and a digital signature of each node (i.e., KAC's ID and KAC's signature) is added to a message requesting an encryption key. This provides, among other things, an audit trail for the request. Each node at a given level of the tree preferably only accepts messages from one node above it and a configured subset of authorized nodes below it. Allowable message types are defined based on whether or not the message was received from a lower level or higher level KAC in the hierarchy. In this embodiment, messages from nodes at the same level are always rejected. Accordingly, each node desirably knows at least part of the tree structure.

Figure 2:
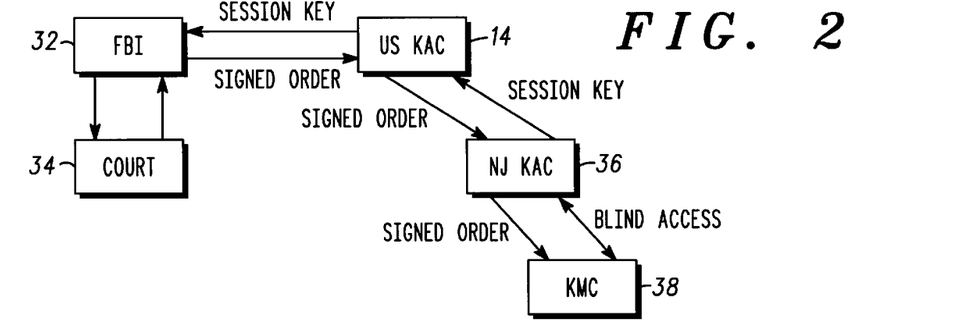
FIG. 2 illustrates a transfer path for a key request in accordance with a preferred embodiment of the present invention.

FIG. 2 illustrates a transfer path for a key request in accordance with the preferred embodiment with the present invention. In FIG. 2, an example government agency 32 (i.e., the FBI) wishes to obtain a court order for session keys of an individual or device. The FBI sends this request to the appropriate court 34. The FBI then receives the order from the court and the signed order is routed to the U.S. KAC 14 from the FBI. The U.S. KAC 14 adds its signature and its ID to the order and forwards it to the next lower KAC until it eventually reaches the terminal KAC for that user or device. Each KAC along the route preferably adds its ID and signature. The terminal KAC, (i.e., KAC 36) sends this order to key management center 38 which engages in a blind access protocol with KAC 36. The session key is received at the terminal KAC 36. KAC 36 forwards the session key back through the hierarchy until the session key reaches the agency 32. Further details are described below.

Figure 3:
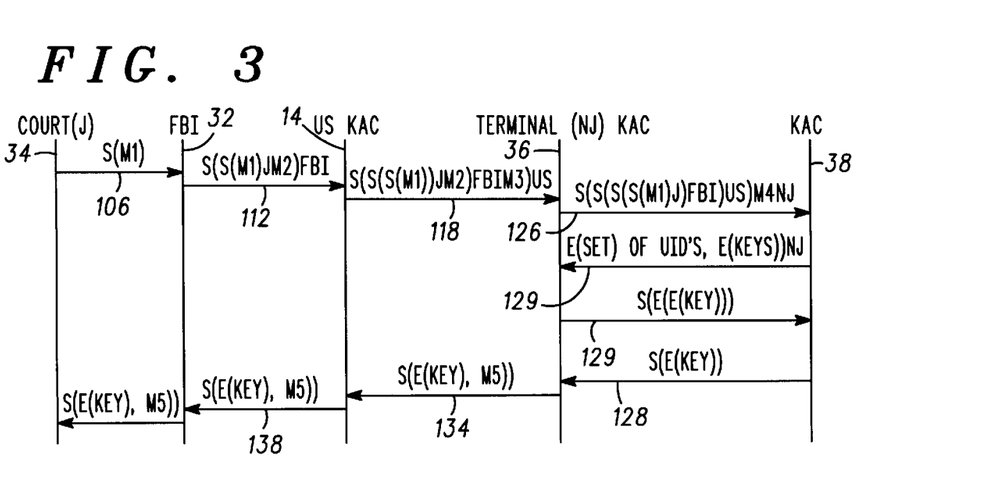
FIG. 3 illustrates a key transfer bounce diagram in accordance with a preferred embodiment of the present invention.

FIG. 3 is illustrates a key transfer bounce diagram in accordance with a preferred embodiment of the present invention. When a court issues a court order for an encryption key, the message sent from the court to the requesting agency 32 is illustrated as M1. M1 preferably includes the ID of the court, a unique serial number associated with the court order, a time stamp, a user type and a user ID, any of which may or may not be encrypted. The message may also include other required authorizations. The message preferably includes a validity period such as start and stop times associated with a court order, and a serial number unique to the court order which may or may not be encrypted. Preferably the court signs this order with its signature and forwards this to the FBI. Among other things, the court's signature on the order allows the KACs verify the legitimacy of the order. The message information sent by the court is illustrated as M1. This is discussed in further detail described below. The FBI submits this signed order to the U.S. key management center which verifies the signature, adds its ID and signature, and forwards the message request to the New Jersey key arbitration center 36.

The message information added by the FBI is illustrated as M2 which includes the ID of the FBI, preferably a time stamp, and any extra information added by the FBI. M3 includes the ID of the U.S. KAC, a time stamp the U.S. KAC and any extra information added by the U.S. KAC. KMC 38 receives this message and verifies both the court and the U.S. key management center's signatures. When the signatures are confirmed, KAC 36 preferably engages in a blind access protocol with KMC 38. The included message sent by KAC 36 to the KMC is illustrated as M4. M4 preferably includes the ID of the KAC 36 (which is the terminal KAC for the user), a time stamp added by KAC 36 and any extra information added by KAC 36. KMC 38 returns an encrypted encryption key to KAC 36. The message information added by U.S. KAC 36 is illustrated in the figure as M5. M5 preferably includes an encrypted user ID, the court order serial number, and a time stamp. M5 may also include the ID of KAC 36.

In the preferred embodiment the actual user/device ID is encrypted with the public key of the terminal KAC which engages in the blind access protocol with the relevant KMC. Accordingly, only this terminal KAC has access to the user/device ID which helps ensure privacy. As shown in FIG. 3, the terminal KMC, as part of the blind access protocol, provides a set of encrypted user ID's and the associated encryption keys to the terminal KAC. The encryption keys are provided encrypted with the KMCs public key. As part of the blind access protocol the terminal KAC selects the appropriate encryption key based on the user ID and sends the selected encryption key back to the KMC after encrypting it with the agency's public key. The KMC then decrypts the results with its private key and sends it back the terminal KAC which transfers it through the hierarchy to the requesting agency. Note that a commutative encryption algorithm is desirable for this blind access protocol. Accordingly, because the public key of the agency requesting the key is used, the terminal KAC does not need to decrypt this key and accordingly this terminal KAC never knows the actual key value. Only the requesting agency will know this actual value, and only the agency and the terminal KAC knows the user ID for the requested session key.

In accordance with a preferred embodiment of the present invention, a user's device has an internal KMC module installed therein when the user's device generates it own keys. This module enables encryption upon registration with any KAC, (becoming the terminal KAC for that KMC) and desirably will respond to requests for session keys. Devices that have more than one possible user and accordingly more than one session key, manages these requests, preferably by engaging a blind access protocol. In the preferred embodiment, KMC modules in particular user devices respond only to requests for keys from the KAC from which it has registered.

Figure 4:
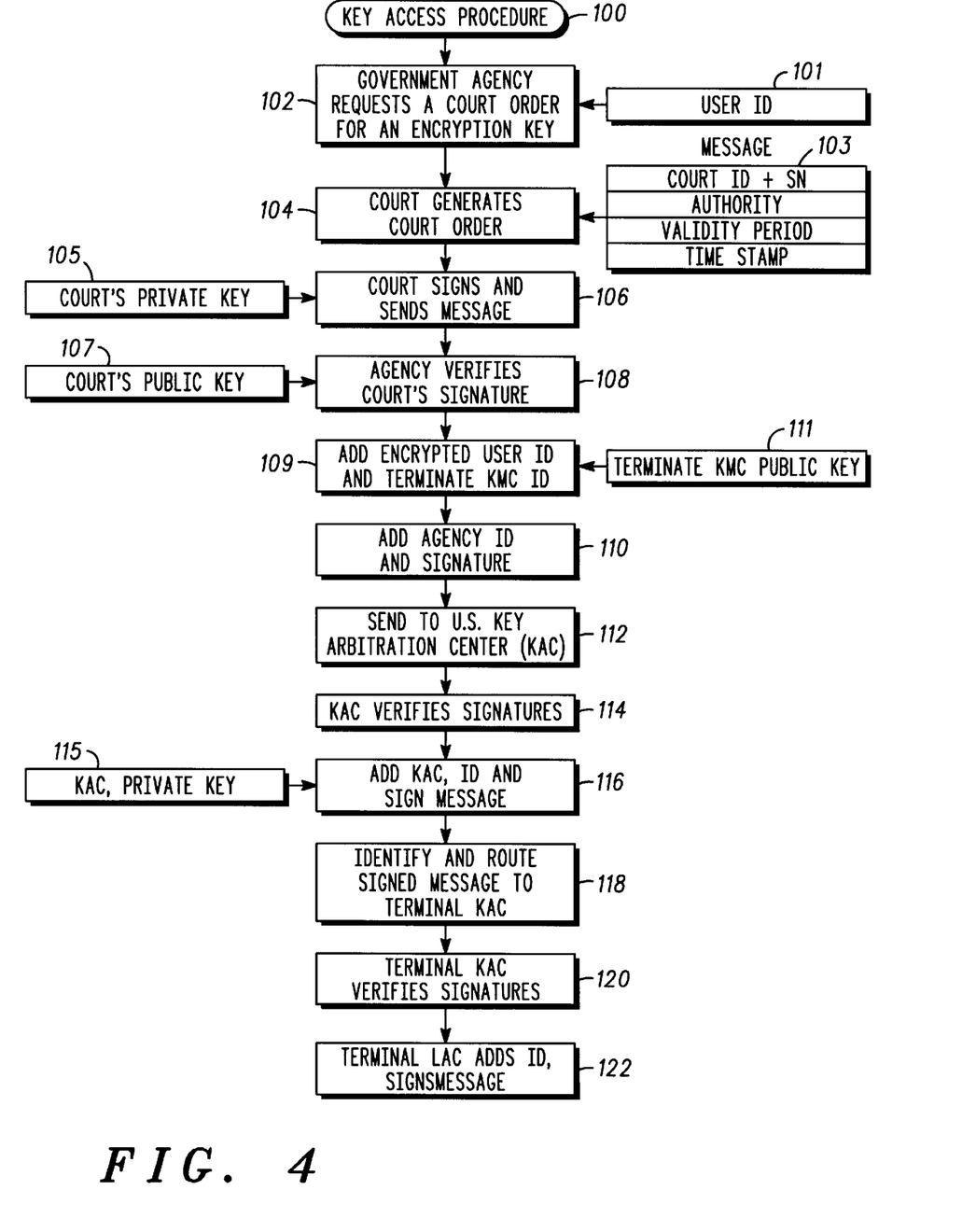
FIGS. 4 and 5 illustrate a flow chart of a key access procedure in accordance with a preferred embodiment of the present invention.
Figure 5:
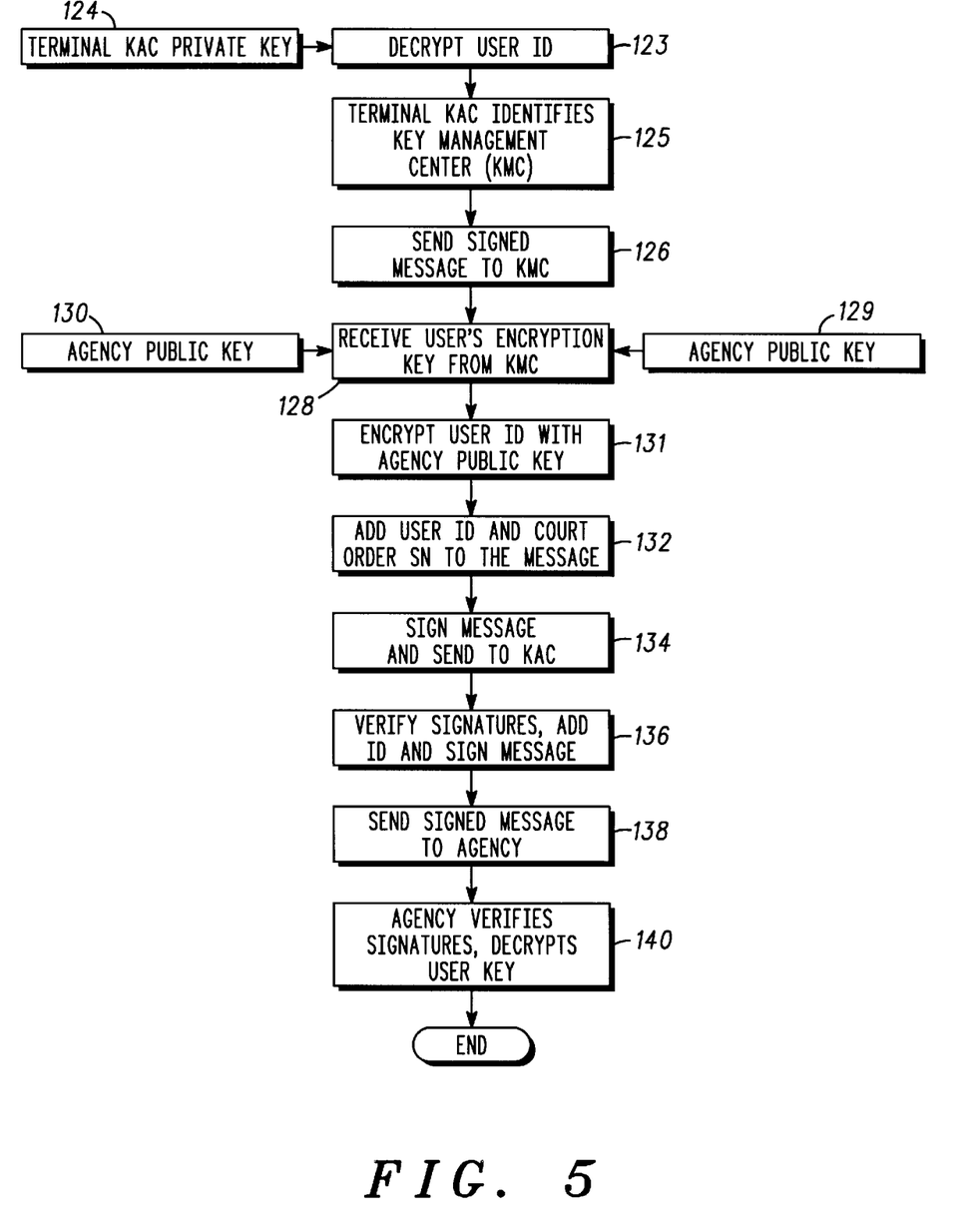

FIGS. 4 and 5 illustrate a flow chart of key access procedure 100 in accordance with a preferred embodiment of the present invention. Procedure 100 may be performed by various equipment or parties in a key management hierarchy, such as the one described above. Organizations operating such equipment may include, for example various courts and government agencies, KACs and KMCs.

In task 102, an organization such as a government agency (e.g., the FBI) requests a court order for an encryption key(s) (e.g., session keys) that have been used or are currently being used by a user or device. The request for the court order preferably includes a user or device ID 101 to identify the individual, and may include other information required by the court to issue a court order for session keys. In the preferred embodiment, the request for the court order sent by the agency is a digitally signed message, signed by the requesting agency. The message may or may not be encrypted, for example, with the court's public key.

In task 104, after the court receives the request for the court order, the court may issue a court order for the encryption key. The court order preferably is a message that includes such information 103 as, for example, the court's ID and a serial number associated with the court order, a time-stamp, the user's ID, an order validity period, and authority information.

In task 106, the court signs its message, preferably with the court's private key 105, and sends the signed message (i.e., the message and signature) to the government agency that has requested the court order. The message portion is preferably not encrypted. However, the user's ID portion of the message may be encrypted, for example, with the agency's pubic key.

In one embodiment of the present invention, the agency performs optional tasks 108 and 110. When the message received from the court has been signed by the court, in task 108, the agency verifies the signature of the court. Preferably, the agency verifies the court's signature with the court's public key 107. In this embodiment, when the signature is valid, the subsequent tasks of the procedure are performed.

In task 109, after receiving the court order message from the court, the agency preferably encrypts the user ID information with the public key 111 of a KAC that is associated with the user's Key Management Center (KMC) (i.e., the terminal KAC for that user), and adds the encrypted user ID to the message. The agency also preferably adds information identifying that KAC (e.g., the terminal KAC ID) as the terminal KAC to the message. Task 109 may also include the task of initially decrypting the user's ID if it had been encrypted by the court.

In task 110, the agency adds the agency's ID to the message and signs the message with the agency's private key before sending the signed message to the appropriate KAC in task 112.

In task 112, the agency forwards this message to the appropriate level KAC in the hierarchy. In the case of United States government agencies such as the FBI, the KAC may be the highest level KAC in the United States (i.e., the U.S. KAC). As discussed in task 109, the request that the agency sends to the KAC preferably includes the user's ID encrypted with the public key of terminal KAC associated with the user.

The signed message sent to the appropriate level KAC in task 112 is preferably is comprised of a message portion and a signature portion. The signature portion is a digital signature based on the message portion, a hash algorithm and the private key of the sender. The message portion preferably includes the message received from the court in task 108 along with the information added by the agency in tasks 109 and 110. Note that the message received from the court may include both a message portion and a signature portion when signed by the court in task 106.

In task 114, the KAC verifies the signatures including the court's signature and the agency's signature. When the signatures are valid, the subsequent tasks of procedure 100 are performed. When any of the signatures are not valid, the KAC may notify the agency from which the message was received of the invalid signature(s).

In task 116, the KAC adds it's ID to the message, and signs the message with it's private key 115. The KAC desirably includes a time stamp within the message. Similar to the message sent in task 112, the message at this point in procedure 100 includes a message portion and the signature portion. The signature portion is the digital signature of the KAC based on the message portion. The message portion preferably includes the signed message received by the KAC in task 112, and also includes the information added by the KAC in task 116. The signature portion is preferably based on the entire message portion.

In task 118, the KAC identifies the terminal KAC associated with the user's KMC based in the information in the received message. The KAC then routes its signed message to the identified terminal KAC.

In the preferred embodiment of the present invention comprised of a hierarchy of KACs, other (non-terminal) KACs may be coupled inbetween the first/initial KAC and the terminal KAC for that user. In this embodiment, the initial KAC routes the message to the next KAC lower in the hierarchy until the message reaches the terminal KAC. Preferably, each KAC in the hierarchy has information on the configuration of the hierarchy so that the message may be routed to the terminal KAC identified in the message. In this embodiment, each KAC along the route preferably performs tasks 114 through 118, adding its ID and signature to the message.

In task 120, the terminal KAC verifies the signature of the KAC from which the message was received, and preferably verifies the signatures of all higher level KACs in the hierarchy which were involved with routing the message requesting the session key. The terminal KAC may also verify the court's signature and the agency's signature. When the signatures are valid, the subsequent tasks of procedure 100 are performed. When any of the signatures are invalid, the terminal KAC preferably notifies the higher level KAC from which the message was received of the invalid signature. An invalid signature message is then preferably routed up through the hierarchy until the agency is notified.

Similarly to task 116, in task 122, the terminal KAC adds it's ID and other information to the message, and signs the message.

In task 125, the terminal KAC identifies the KMC for the particular user. This, for example, is accomplished by reading the user ID within the message, and associating the user with a KMC associated with the terminal KAC. In the preferred embodiment of the present invention, the user ID is encrypted with the public key of the terminal KAC to help insure privacy. In this embodiment, task 123 is performed which includes the step of decrypting the user ID with the terminal KAC's private key 124 to determine the user ID and the appropriate KMC. In the preferred embodiment, only the terminal KAC has access to the user ID to help insure privacy. Users (either individuals or organizations with many users) preferably choose which terminal KAC to sign up with, and presumably will choose terminal KACs that are considered more trustworthy.

In task 126, the terminal KAC sends the signed message it generated in task 122 requesting a key to the identified KMC. Note that in the preferred embodiment, the message that is sent to the KMC does not include a (clear text) user ID and accordingly, does not allow the KMC to determine which user's session key is being requested. In this way, the KMC does not know the identity of the device or individual user to be monitored by the agency.

In task 128, the KMC provides the requested session key or keys to the terminal KAC. Preferably, the terminal KAC performs blind key access procedure 129 or a similar protocol with the KMC to receive the session key of the individual without the KMC knowing which session key is provided. As part of procedure 129, in the preferred embodiment, the KMC provides the session key to the terminal KAC already encrypted with the agency's public key 130. Accordingly, in this embodiment, the terminal KAC does not have access to the actual session key value. Only the requesting agency will know the actual key value. Furthermore, only the requesting agency and the terminal KAC know the user ID of the key.

An example of a suitable blind key access procedure is described in U.S. Pat. No. 5,564,106, entitled "Method for Providing Blind Access to an Encryption Key", issued Oct. 8, 1996, which is hereby incorporated by reference. In general, a blind access protocol provides an encryption key to a requestor without the sender being able to identify which key has been requested. When a blind key access procedure is used in conjunction with tasks 126 and 128, the message that the terminal KAC sends to the KMC desirably does not include an unencrypted user ID. A blind key access procedure may require that both the agency's key and the key used by the terminal KAC use a communitative encryption algorithm well known in the art.

In another embodiment that does not fully implement a blind key access protocol, the terminal KAC encrypts the session key received from the KMC with the agency's public key, before routing it up through the hierarchy.

The terminal KAC may now route the encrypted session key(s) up through the hierarchy and back to the agency requesting the session key. The terminal KMC may add additional information to the message before routing the encrypted session key back up through the hierarchy of KACs to the agency. For example, in task 131, the terminal KAC encrypts the user ID with the agency's public key, and in task 132, the terminal KAC may add the encrypted user ID, court order serial number, and other information to the message before routing the message to the next higher level KAC in the hierarchy in task 134.

In one embodiment, the terminal KAC signs the message (with the terminal KAC's private key) before routing the message to the next higher level KAC in the hierarchy in task 134. In this embodiment, the next higher level KAC verifies the terminal KAC's signature, preferably adds its ID to the message and signs the message in task 136 before further routing the message to the next higher lever KAC in the hierarchy. Preferably, each KAC in the hierarchy involved in routing the encrypted session key back to the requesting agency performs task 136, until the highest level KAC sends the message to the requesting agency in task 138. In the example discussed herein, the KAC at the level associated the government agency (e.g., FBI) is the U.S. KAC.

In another embodiment of the present invention, the terminal KAC routes the session key directly to the agency. In this embodiment, the session key may or may not be encrypted with the agency's public key, and may depend on whether or not the session key was received encrypted from the KMC.

In task 140, the agency receives the session key, verifies the signatures of the lower KACs, and decrypts the user's session key or keys using the agency's private key. Now the agency has access to the user's session key value and may use the session key in accordance with the court order, and preferably, only until such court order expires.

In a preferred embodiment of the present invention, a court order issued by a court has a time stamp and a validity period associated with the order. In this embodiment, when the terminal KAC receives the request for the session key (i.e., task 118), the terminal KAC records this validity period of the court order, and stores this information with the user ID. Furthermore, in this embodiment of the present invention, a session key received from the KMC in task 128 includes a validity period for the session key. When the validity period for the session key expires, the session key is no longer valid and the user obtains a new session key. The terminal KAC also stores the session key validity period associated with the user ID.

In one preferred embodiment, the KMC keeps a record that includes the court orders and the validity period of the court orders. Because a KMC that engages in a blind access procedure to provide an encryption key does not know which user a court order applies to, when a court order expires, the KMC preferably issues all new session keys to users and expires or cancels previously issued session keys.

In another preferred embodiment of the present invention, the terminal KAC keeps a record that includes the court orders and the validity period of the court orders. When a court order expires, the terminal KAC notifies the KMC that a particular court order has expired. Accordingly, the KMC then issues new session keys to users and expires or cancels the previously issued session keys.

In other embodiments of the present invention, upon expiration of a session key validity period during when the court order for the session key is valid, the terminal KAC requests the new session key for the user. Preferably, a blind key access procedure is also used so that user's who key is being requested is not identified by the KMC.

In other embodiments of the present inventions, the KACs and KMCs in the hierarchy include time stamps within their messages. In these embodiments, each subsequent KAC sending and receiving a message compares the time stamp of the prior KAC to determine if more than a predetermined amount of time has passed. When more that the predetermined amount of time has passed, the KAC receiving the message deems the message invalid, and preferably notifies the requesting agency.

In an alternative embodiment of the present invention, referred to as a split key embodiment, a KMC is associated with at least two distinct and separate terminal KACs. In this embodiment, requests for session keys are submitted to each terminal KAC associated with the user's KMC, in a similar manner to that described above. In response to a request for the session key, the KMC provides a portion of the session key to one terminal KAC, and another portion to another terminal KAC. When there are two terminal KACs, the KMC preferably provides one half the session key (e.g., k1) to one terminal KAC and the other half of the session key (e.g., k2) to the other terminal KAC. The actual session key is a combination of K1 and K2, and is preferably the binary exclusive-OR of the key portions. However, other combinations of split keys may also be used. For example, K1 and K2 each may simply represent part or half of the complete session key bits. Alternatively, K1 and K2 may be separately generated and the complete session key may be a combination of the two individual keys.

The split key embodiment of the present invention is not limited to two session key portions, and is applicable to N session key portions where N may be several hundred. In these embodiments, each key portion is provided to a different terminal KAC, and preferably provided using a blind key access procedure.

When the requesting agency receives the key portions, it combines the session key portions as appropriate to arrive at the complete session key. An advantage to this embodiment is that no terminal KAC has access to the whole session key. Spreading key information over N locations further enhances privacy and reduce the possibility of unauthorized key access.

Thus, a method for encryption key access and key recovery has been described which overcomes specific problems and accomplishes certain advantages relative to typical methods and systems. The improvements over known technology are significant. For example one advantage to the present invention, as described in a preferred embodiment, is that session keys may be obtained only when proper court authorization is obtained. Another advantage to the present invention, as described in a preferred embodiment, is that manufacturers, operators or attackers are not able to decrypt a user's messages in any amount of time commensurate with the security level in use by the user. Another advantage to the present invention, as described in a preferred embodiment, is that user's messages are not able to be decrypted after a court order expires. Another advantage to the present invention, as described in a preferred embodiment, is that only authorized parties, such as the government and court, know the identity of the individual or device which key is being accessed (e.g., the person or device which will be wiretapped or monitored). Another advantage to the present invention, as described in a preferred embodiment, is that manufacturers, operators, and attackers, in general, will not be able to determine who is being monitored.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. In a hierarchical key management system comprising a plurality of key arbitration centers (KAC) arranged in a hierarchy, a method for providing access to an encryption key of a user comprising the steps of:

receiving a signed message at a first KAC, said signed message comprising a message portion and an organization signature, said message portion identifying said user and an organization requesting said encryption key, said organization signature being said message portion digitally signed by said organization;

verifying said organization signature by said first KAC;

adding a first KAC ID to said message portion when said organization signature is valid;

after the adding step, signing by said first KAC, said message portion and said organization signature to generate a first KAC signature;

sending said first KAC signature, said organization signature and said message portion to a second KAC, said second KAC being at a next lower level in said hierarchy;

verifying, by said second KAC, said first KAC signature and said organization signature; and said second KAC requesting said encryption key from a key management center (KMC) to receive said encryption key.

2. A method as claimed in claim 1 wherein the requesting step includes the step of said second KAC engaging in a blind key access protocol with said KMC to receive said encryption key, and wherein the receiving step, the message portion is digitally signed with a private key of said organization, and wherein the receiving step includes the step of receiving as part of said message portion, a user identifier (UID) encrypted with a public key of said second KAC, said second KAC being a terminal KAC for said user, and wherein said message portion also includes a destination ID identifying said second KAC as said terminal KAC.

3. A method as claimed in claim 2 wherein said signed message includes a request for said encryption key, and wherein said receiving step includes the step of receiving said message portion, said message portion including a validity period for said request, said method further comprising the step of said terminal KAC checking that said request is valid based on said validity period, said second KAC performing said engaging step during said validity period, and     wherein the engaging step includes the steps of:

receiving a session key associated with said user from said KMC;

and receiving a validity time associated with said session key,     and wherein the method further comprises the step of said second KAC, upon expiration of the validity time of the session key, requesting subsequent session keys for said user from said KMC during said validity period of said request,     said second KAC routing said subsequent session keys to said organization.

4. A method as claimed in claim 3 further comprising the steps of:

encrypting said subsequent session keys with a public key of said organization; and     sending a signed message to said first KAC, said signed message including said encrypted subsequent session keys, said signed message being signed with a private key of said second KAC.

5. A method as claimed in claim 3 further comprising the steps of:

determining by said KMC when said validity period for said request has expired; and     said KMC issuing new session keys in response to the determining step.

6. A method as claimed in claim 3 further comprising the step of said second KAC, prior to the engaging step, verifying that said first KAC is authorized to communicate with said second KAC, the verifying by said second KAC step including the step of determining that said first KAC is at a next higher level in said hierarchy.

7. A method as claimed in claim 6 said request includes a court order and wherein the receiving a signed message step, said organization is a court that has issued said court order to a government agency to obtain said encryption key, and wherein said message includes information identifying said court and an authority for said court order.

8. A method as claimed in claim 7 further comprising the step of identifying said terminal KAC based on said destination ID.

9. A method as claimed in claim 8 wherein the adding step further comprising the steps of:

said first KAC adding a time-stamp to said message portion; and     said second KAC performing the engaging step only within a predetermined period of time of said time-stamp.

10. A method as claimed in claim 9 wherein the receiving a signed message step, said UID corresponds with a device.

11. A method as claimed in claim 9 wherein the receiving a signed message step, said UID corresponds with an individual.

12. In a hierarchy of key arbitration centers (KACs), a method for providing session keys of a user comprising the steps of:

higher level KACs of said hierarchy routing a request for said session keys to lower level KACs, said KACs being arranged in a hierarchy of KACs; and     said lower level KACs of said hierarchy routing encrypted session keys to said higher level KACs, wherein     each KAC that performs the routing a request step, also performs the steps of signing said request with a private key of said KAC and routing said request to one of said lower level KACs, and     wherein each KAC receiving said request from a higher level KAC, also performing a step of verifying a signature of said higher level KAC.

13. A method as claimed in claim 12 further comprising the step of one of said lower level KACs engaging in a blind access protocol with a key management center (KMC) to receive said session keys of said user.

14. A method as claimed in claim 13 further comprising the step of said lower level KAC receiving one of said session keys, said one session key being encrypted with a public key of an organization requesting said one session key.

15. A method as claimed in claim 14 further comprising the steps of:

said higher level KAC receiving a request for said one session key, said request being a signed message identifying said user and said organization, said signed message having been signed with a private key of said organization; and     said higher level KAC verifying a signature of said organization using a public key of said organization, said public key of said organization corresponding with said private key of said organization.

16. A method as claimed in claim 15 additionally comprising the step of each of said higher level KACs adding an ID of said each higher level KAC performing said routing a request step, the adding step being performed prior to the routing a request step.

17. A hierarchical key management system comprising:

a plurality of key arbitration centers (KAC) arranged in a hierarchy for communicating with each other; and     a plurality of key management centers (KMC) for storing session keys of users, each KMC configured for communicating with one of said KACs, wherein     said KACs route requests for session keys to lower level KACs of said hierarchy,     said KACs route encrypted versions of said session keys to designated higher level KACs of said hierarchy, and     KACs at end nodes of said hierarchy request said session keys from said KMC.

18. A system as claimed in claim 17 wherein each KAC that routes one of said requests, also signs said request with a private key of said KAC and routes said request to one of said lower level KACs, and     wherein each KAC receiving said request from a higher level KAC, also verifies a signature of said higher level KAC,     wherein one of said lower level KAC engages in a blind access protocol with a key management center (KMC) to receive said session keys of said user, and said lower level KAC receives said session key encrypted with a public key of an organization requesting said session key.

19. A system as claimed in claim 18 wherein said higher level KACs add an ID of said each higher level KAC prior to routing said request.

20. In a hierarchical key management system comprising a plurality of key arbitration centers (KAC) arranged in a hierarchy, a method for providing access to an encryption key of a user comprising the steps of:

receiving a signed message at a first KAC, said signed message requesting said encryption key;

verifying a signature of said signed message by said first KAC;

adding a first KAC ID to a message portion of said signed message;

signing said message portion by said first KAC, to generate a first KAC signature;

sending a second signed message to a second KAC in said hierarchy, said second signed message including said first KAC signature;

verifying, by said second KAC, said first KAC signature; and said second KAC receiving said encryption key in response to the verifying step.

21. A method as claimed in claim 20 wherein:

the receiving step further comprises the step of receiving said signed message, wherein said signed message comprises a message portion and an organization signature, said message portion identifying said user an organization requesting said encryption key, said organization signature being said message portion signed with a private key of said organization;

wherein the adding step is performed when said organization signature is valid;

wherein the signing step is performed after the adding step, and includes the step of signing by said first KAC, said message portion and said organization signature to generate said first KAC signature;

wherein said second signed message includes said first KAC signature, said organization signature and said message portion, said second KAC being a next lower KAC in said hierarchy, wherein the verifying said first KAC signature step includes the step of verifying said organization signature, and wherein said second KAC receiving step includes the step of engaging in a blind key access protocol with a key management center (KMC) to receive said encryption key.

* * * * *